United States Patent
Parthasarathy et al.

(10) Patent No.: US 11,306,552 B2
(45) Date of Patent: *Apr. 19, 2022

(54) CONTROL SYSTEM FOR A WELL DRILLING PLATFORM WITH REMOTE ACCESS

(71) Applicant: ADS Services LLC, Midland, TX (US)

(72) Inventors: Anand Parthasarathy, Cypress, TX (US); Scott Charles, Houston, TX (US); Syed Rasheed, Pearland, TX (US)

(73) Assignee: ADS SERVICES, LLC, Midland, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/218,048

(22) Filed: Mar. 30, 2021

(65) Prior Publication Data
US 2021/0215009 A1 Jul. 15, 2021

Related U.S. Application Data

(63) Continuation of application No. 16/296,668, filed on Mar. 8, 2019, now Pat. No. 10,961,794, which is a continuation-in-part of application No. 16/331,416, filed as application No. PCT/US2017/051818 on Sep. 15, 2017, now Pat. No. 11,047,182.

(Continued)

(51) Int. Cl.
*E21B 44/00* (2006.01)
*E21B 21/08* (2006.01)
(Continued)

(52) U.S. Cl.
CPC .............. *E21B 21/08* (2013.01); *E21B 34/06* (2013.01); *E21B 44/00* (2013.01); *E21B 47/13* (2020.05); *G06F 3/0482* (2013.01)

(58) Field of Classification Search
CPC ................................ E21B 44/00; E21B 21/08
See application file for complete search history.

(56) References Cited

U.S. PATENT DOCUMENTS

| | | |
|---|---|---|
| 2004/0182574 A1 | 9/2004 | Adnan et al. |
| 2005/0092523 A1 | 5/2005 | McCaskill et al. |
| 2006/0207795 A1 | 9/2006 | Kinder et al. |
| 2006/0240818 A1 | 10/2006 | McCoy et al. |

(Continued)

FOREIGN PATENT DOCUMENTS

| | | |
|---|---|---|
| WO | 2013152078 A2 | 10/2013 |
| WO | 2015023411 A1 | 2/2015 |

OTHER PUBLICATIONS

EP search report for EP19161622.6 dated Jul. 25, 2019.
(Continued)

*Primary Examiner* — Kipp C Wallace

(57) ABSTRACT

A control system and method for a well drilling platform having a plurality well platform systems is provided. The control system includes at least one remote communication unit (RCU), and a controller. The controller is in communication with the well platform systems, and has at least one processor, and a memory device that is coupled to the processor and that stores the instructions. When executed by the processor, the instructions cause the controller to communicate with the well platform systems to receive information from one or more well platform systems and to send system control commands to the one or more well platform systems. The controller and the at least one RCU are configured to electronically communicate with one another information relating to at least one of the well platform systems.

18 Claims, 7 Drawing Sheets

Related U.S. Application Data

(60) Provisional application No. 62/640,341, filed on Mar. 8, 2018, provisional application No. 62/394,942, filed on Sep. 15, 2016.

(51) Int. Cl.
  *G06F 3/0482* (2013.01)
  *E21B 34/06* (2006.01)
  *E21B 47/13* (2012.01)

(56) References Cited

U.S. PATENT DOCUMENTS

| | | |
|---|---|---|
| 2007/0246263 A1 | 10/2007 | Reitsma |
| 2008/0094247 A1 | 4/2008 | Milne |
| 2012/0118636 A1 | 5/2012 | Koederilz |
| 2012/0165997 A1 | 6/2012 | Lewis et al. |
| 2013/0231781 A1 | 9/2013 | Chapman |
| 2015/0047834 A1 | 2/2015 | Nott et al. |
| 2015/0053483 A1 | 2/2015 | Mebane, III |
| 2016/0076356 A1 | 3/2016 | Krems et al. |
| 2016/0097270 A1 | 4/2016 | Pobedinski et al. |
| 2016/0222775 A1 | 8/2016 | Tunc et al. |
| 2016/0290119 A1 | 10/2016 | Tunc et al. |
| 2017/0226813 A1 | 8/2017 | Northam et al. |
| 2017/0335654 A1 | 11/2017 | Olsen et al. |
| 2018/0135366 A1 | 5/2018 | Olsen et al. |
| 2019/0078405 A1 | 3/2019 | Zheng et al. |

OTHER PUBLICATIONS

EP: Communication Pursuant to Article 94(3) EPC of EP Application 19161622.6 (related application); dated Mar. 1, 2021; 8pages.

CONTROL SYSTEM FOR A WELL DRILLING PLATFORM WITH REMOTE ACCESS

CROSS-REFERENCE TO RELATED APPLICATIONS

This application is a continuation of U.S. patent application Ser. No. 16/296,668, filed Mar. 8, 2019, entitled CONTROL SYSTEM FOR A WELL DRILLING PLATFORM WITH REMOTE ACCESS. U.S. patent application Ser. No. 16/296,668 claims benefit of U.S. patent application No. 62/640,341, filed Mar. 8, 2018, and is a continuation-in-part of U.S. patent application Ser. No. 16/331,416, filed Mar. 7, 2019, entitled INTEGRATED CONTROL SYSTEM FOR A WELL DRILLING PLATFORM. U.S. patent application Ser. No. 16/331,416 is a 371 national stage Application of PCT Patent Application No. PCT/US2017/051818 filed Sep. 15, 2017. PCT Patent Application No. PCT/US2017/051818 claims benefit of U.S. Patent Application No. 62/394,942 filed Sep. 15, 2016. U.S. patent application Ser. No. 16/296,668, U.S. Patent Application No. 62/640,341, U.S. patent application Ser. No. 16/331,416, PCT Patent Application. No. PCT/US2017/051818 and U.S. Patent Application No. 62/394,942 are all incorporated herein in their entirety.

TECHNICAL FIELD

The present disclosure relates to control systems for subterranean wells that produce hydrocarbon oil and gas products, and to integrated control systems for the same.

BACKGROUND

Subterranean wells (subsea or land based) are typically created by drilling a hole into the earth with a drilling rig that rotates a drill string that includes a hollow drill pipe and a drill bit attached to an end of the drill pipe. After the hole is drilled, casing sections are inserted into the hole to provide structural integrity to the newly drilled wellbore, and in some instances to isolate potentially dangerous high pressure zones from each other and from the surface. This process may be repeated several times (e.g., two to five times) at increasingly smaller bore diameters to create a well at a desired depth.

To facilitate the drilling process, a drilling fluid (often referred to as "mud") is typically pumped down the inside of the drill pipe and exits at the drill bit. The drilling fluid may be a fluid, or may be a mixture of fluids, solids and chemicals that is tailored to provide the correct physical and chemical characteristics required to safely drill the well; e.g., cool the drill bit, lift cuttings to the surface, prevent destabilization of the rock in the wellbore walls, overcome the pressure of fluids inside the rock so that these fluids do not enter the wellbore, etc. The debris (often referred to as "cuttings") generated by the drilling process is swept up by the drilling fluid as it circulates back to surface outside the drill pipe. The drilling fluid and debris is subsequently processed to separate the cuttings and return the circulating drilling fluid to the drilling process. A pumping system (typically referred to as a "mud pump") is typically used to circulate the drilling fluid.

During the drilling process, the fluids located at the bottom of the well are typically said to be at a "bottomhole" pressure (PBH), which pressure is a function of the hydrostatic pressure within the well and may also be a function of annular friction pressure during a dynamic condition. For a variety of reasons, it is desirable to maintain a substantially constant PBH that is higher than the fluid pressure in the local formation (i.e., the formation pressure). During the drilling process, however, the drilling may encounter a well region that contain fluids (e.g., oil and gas) at a relatively elevated high pressure (i.e., a formation pressure that is higher than the PBH). The elevated formation pressure is typically referred to as a "kick", and if the kick is great enough and unchecked could lead to a "blowout". There are several techniques and methodologies currently available for addressing "kicks". For example, virtually all modern wells include one or more blowout preventers.

Some wells utilize a "managed pressure drilling" (MPD) system during the normal course of drilling that is configured to maintain a substantially constant PBH during drilling; i.e., MPD systems can be utilized to control the annular pressure profile throughout the wellbore. MPD systems typically include one or more manifolds, one or more gate valves, and a plurality of choke valves. A "choke valve" is a flow restriction device that may have a fixed flow restriction (e.g., a fixed orifice) or a variable flow restriction (e.g., a variable orifice). Choke valves having a variable flow restriction may be configured with a manually adjustable orifice, or a power adjustable orifice (e.g., a solenoid valve, etc.). The one or more manifolds may be configured to direct fluids into the well or to direct fluids exiting the well to different systems at the drilling rig (e.g., a mud shaker system, one or more flairs, a mud/gas separator, etc. The gate valves may be utilized to allow or prevent fluid flow. The choke valves may be utilized to create a variable flow impediment that selectively affects the pressure of fluids entering the well (e.g., mud) and fluids exiting the well.

Some wells may include a "well control" system in place of or in combination with a MPD system. Well control systems are often utilized as a redundant back up for a MPD system, configured to operate in the event of an issue with the MPD system or an issue that cannot be addressed by the MPD system; e.g., a stuck tool, etc. Like the MPD system, the well control system may include one or more manifolds, one or more gate valves, and one or more choke valves (fixed orifice or adjustable orifice, or some combination of fixed orifice choke valves and adjustable orifice choke valves). Typically, the well control system is not configured as an automated system but rather is controlled by an operator.

Some wells include a diverter manifold (sometimes referred to as a "buffer" manifold) that may be configured to receive well fluids and permit the operator to selectively divert the well fluid to a variety of different systems (e.g., a "mud shaker" or a "cutting separator system" configured to separate mud from well cuttings, a flair where volatiles can be burned off, the MPD system, a trip tank system, a mud/gas separator—"MGS", etc.) depending on the application at hand.

Some wells include a "Rig Manifold' (sometimes referred to as a "Rig Choke" manifold, or a "Choke and Kill" manifold) having a plurality of choke valves and gate valves that can be operated to reduce the fluid pressure at the well head in a controlled manner. In some instances, the choke and kill manifold can be used to direct well fluid exiting the well, or components of the well fluid to different well systems, etc.

The various different prior art fluid control devices and systems, including those that are described above, have historically been configured to operate independent of one another and are therefore independently controlled. In many of these devices/systems, it is necessary for an operator to actuate (e.g., open/close) specific devices in a predetermined sequence to achieve the desired fluid control. The sequential operation is not only time consuming and inefficient, but also increases the opportunity for operator error; e.g., devices actuated out of sequence or not at all, etc. In some instances, when one or more operational parameter changes (e.g., choke valve settings, etc.) are made to a first system, it may be necessary to make the same change, a similar change, or a related change to another system. The lack of communication between the systems, or inability to communicate, may make it necessary for the operator to access and adjust multiple systems, which can add to the inefficient operation and potential for operator error. The lack of communication between prior art systems, or inability to communicate, can also impede operation of the well. For example, a first system may produce an alert (or other information) regarding an operational parameter to an operator. If the "alerting" system does not or cannot provide that information to other systems, then necessary action in the other systems may be reliant on the operator. The prior art multiple systems also require that an operator be knowledgeable in a plurality of different systems.

Hence, there is a need for an integrated approach to well operation, one that facilitates the overall operation of the well, one that decreases the potential for operator error, and one that improves the safe operation of the well.

SUMMARY

According to an aspect of the present disclosure, a control system for a well drilling platform is provided, the well drilling platform having a plurality well platform systems. The control system includes at least one remote communication unit (RCU) located remote from the well drilling platform, and a controller located at the well drilling platform. The controller is in communication with the well platform systems. The controller has at least one processor that executes instructions, and a memory device that is coupled to the at least one processor and that stores the instructions that, when executed by the at least one processor, cause the controller to selectively communicate with one or more of the well platform systems to receive information from the respective one or more well platform systems and to selectively send system control commands to the respective one or more well platform systems. The controller and the at least one RCU are configured to selectively electronically communicate with one another information relating to at least one of the well platform systems.

In any of the aspects or embodiments described above and herein, the controller and the at least one RCU may be configured to selectively communicate with one another by a wired connection.

In any of the aspects or embodiments described above and herein, the controller and the at least one RCU may be configured to selectively communicate with one another by a wireless connection.

In any of the aspects or embodiments described above and herein, the controller may be configured to selectively communicate with the at least one RCU by email or text message.

In any of the aspects or embodiments described above and herein, the at least one RCU may be configured to selectively communicate an RCU control command to the controller, and upon receipt of the RCU control command, the instructions may cause the controller to communicate with the one or more well platform systems based on the received RCU control command.

In any of the aspects or embodiments described above and herein, wherein in response to an RCU control command to perform a well drilling platform function, said function requiring a coordinated state between a first of the plurality of well platform systems and at least a second of the plurality of well platform systems, the instructions may cause the controller to configure the at least first of the well platform systems and the at least second of the plurality of well platform systems into the coordinated state.

In any of the aspects or embodiments described above and herein, the plurality of well platform systems may include a diverter manifold and at least one of a managed pressure drilling system, a well control system, a pressure relief valve system, a rig manifold, a mud gas separator, a mud pump system, a trip tank system, or a cuttings separator system.

In any of the aspects or embodiments described above and herein, in response tan RCU control command, the stored instructions, when executed by the at least one processor, may cause the controller to configure the diverter manifold and the managed pressure drilling system to the coordinated state.

In any of the aspects or embodiments described above and herein, the diverter manifold may include a plurality of valves and the managed pressure drilling system may include a plurality of valves, and wherein the coordinated state includes a sequential operation of at least one of the plurality of valves of the diverter manifold and at least one of the plurality of valves of the managed pressure drilling system.

In any of the aspects or embodiments described above and herein, the RCU may be a device having a device processor and device instructions stored within a device memory.

In any of the aspects or embodiments described above and herein, the RCU may be a computer, a tablet, or a smart phone.

In any of the aspects or embodiments described above and herein, the controller and the at least one RCU may be configured to selectively electronically communicate with one another using a virtual private network.

According to another aspect of the present disclosure, a method of controlling a well drilling platform is provided, the well drilling platform having a plurality well platform systems. The method includes: providing at least one remote communication unit (RCU) located remote from the well drilling platform, and a controller located at the well drilling platform, the controller in communication with the well platform systems, the controller having at least one processor that executes instructions, and a memory device that is coupled to the at least one processor and that stores the instructions; and using the controller to: selectively electronically communicate with one or more of the well platform systems to receive information from the respective one or more well platform systems and to selectively send system control commands to the respective one or more well platform systems; and selectively electronically communicate between the controller and the at least one RCU information relating to at least one of the well platform systems.

In any of the aspects or embodiments described above and herein, the method may include using the at least one RCU to communicate an RCU control command to the controller; and upon receipt of the RCU control command, using the controller to communicate with the one or more well platform systems based on the received RCU control command.

In any of the aspects or embodiments described above and herein, the RCU control command may include a command to perform a well drilling platform function that requires a coordinated state between a first of the plurality of well platform systems and at least a second of the plurality of well platform systems, and the method may include configuring the at least first of the well platform systems and the at least second of the plurality of well platform systems into the coordinated state.

In any of the aspects or embodiments described above and herein, wherein the controller selectively communicates with the at least one RCU by email or text message.

The features of the present disclosure will become apparent in light of the detailed description of the invention provided below, and as illustrated in the accompanying drawings.

BRIEF DESCRIPTION OF THE DRAWINGS

For a more complete understanding, reference is now made to the following description taken in conjunction with the accompanying Drawings in which.

DETAILED DESCRIPTION

Figure 1:
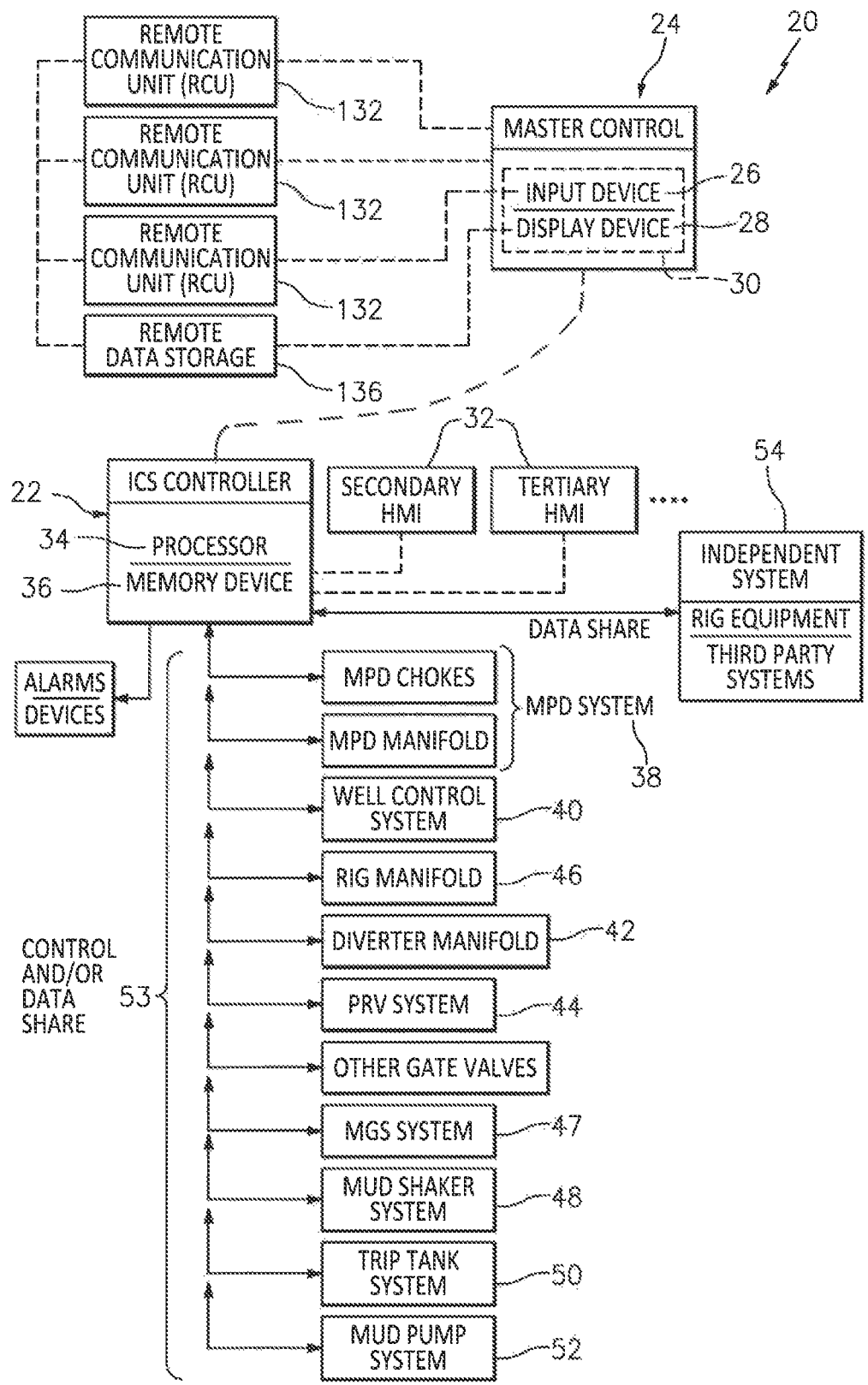
FIG. 1 is an exemplary diagram of an embodiment of the present integrated control system.

It is noted that various connections are set forth between elements in the following description and in the drawings (the contents of which are included in this disclosure by way of reference). It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities.

Aspects of an integrated control system 20 for use with a well drilling platform, and methods for controlling aspects of the well drilling platform are provided. The term "well drilling platform" refers to a system for drilling a hole that extends into the earth typically for the purpose of, but not limited to, bringing hydrocarbon fluids (e.g., oil and/or gas) to the surface. The aforesaid well drilling platforms may be located onshore or offshore. Well drilling platforms located offshore may have a subsea wellhead or may have a dry wellhead. As will be discussed below, a well drilling platform may include a variety of different well platform systems and devices (collectively referred to hereinafter as "well platform systems 53" or generically to an individual one as a "well platform system 53") that participate in the well drilling process, including but not limited to a managed pressure drilling (MPD) system, a well control system, a diverter manifold (sometimes referred to as a buffer manifold), a pressure relief valve (PRV) system, and a rig manifold (sometimes referred to as a choke and kill manifold).

The integrated control system 20 (referred to hereinafter as the "ICS") includes at least one ICS controller 22 and a master control station 24. The master control station 24 includes an input device 26 and a display device 28. The operator input device 26 (e.g., an HMI, a keyboard, a key pad, a touch screen, switches, joysticks, etc.) is configured to allow an operator to input instructions, data, etc. to the ICS controller 22. The display device 28 (e.g., an HMI, a CRT monitor, a flat-panel display, an LCD, etc.) is configured to receive information from the ICS controller 22 and display the same or different information to the operator. In addition to the visual capabilities of the display device 28, the ICS may also include audible capabilities for providing information to the operator. In a preferred embodiment, the operator input device 26 and display device 28 may be combined in the form of a human machine interface (HMI) 30. The master control HMI 30 cooperates with the ICS controller 22 to provide a graphics based visualization (e.g., that may include a graphical user interface—"GUI") that allows an operator to interact (e.g., input instructions and read displayed information) with the ICS 20. The master control HMI 30 may be configured to operate as a touch screen, and may include a GUI input capability (e.g., symbols that can be "clicked" on via a mouse, or a touch screen) or may be used in combination with a conventional input device 26 (e.g., a keyboard or keypad), or some combination thereof. In addition to the master control station 24, the ICS 20 may include a plurality of secondary control stations 32 (e.g., in the form of an HMI as described above) located at different locations on the well drilling platform (e.g., see FIG. 1). The secondary control stations 32 can be configured in a variety of different ways. For example, one or more of the secondary control stations 32 may be configured to display information received from the ICS controller 22, and not permit information or control input to the ICS controller 22. Alternatively, a secondary control station 32 may be configured to enable an operator to control (and monitor) the ICS 20 from a location remote from the master control station 24. Hence, the specific functionality of a secondary control station 32 may be the same as the master control station 24, or it might be configured to provide less information and/or control capabilities than the master control station 24. The ICS 20 may be set up with security profiles that grant privileges to specific operators and/or secondary control stations 32; e.g., some operators may have full privileges, while others have less privileges. In addition, the ICS controller 22 may be configured such that the master control station 24 and the secondary control stations 32 are in a master/subordinate arrangement to avoid contradictory operator input, etc., or more generically, one control station 24, 32 may be identified as the master, and the other control stations 24, 32 as subordinates; e.g., when one of the control stations 24, 32 is designated as a master, the other control stations 24, 32 may only have viewing capabilities and no ability to edit or modify operational parameters. The ICS controller 22 may be configured so that when data or commands are input at the control stations 24, 32 then acting as the master, the stored instructions cause the ICS controller 22 to automatically update the data or well platform system 53 status shown at the other control stations 24, 32.

The ICS controller 22 (i.e., any of the controllers) may include any type of computer, computing device, computational circuit, or any type of processing circuit capable of executing a series of instructions that are stored in a memory device 36. The ICS controller 22 may include one or more processors and/or multicore CPUs (collectively referred to hereinafter as a processor 34 to facilitate the description). The processor 34 may be a microprocessor, a digital signal processor, a co-processor, a micro-controller, a microcomputer, a central processing unit, a field programmable gate array, a programmable logic device, a state machine, logic circuitry, analog circuitry, digital circuitry, etc., and any combination thereof. The instructions stored in the memory device 36 may represent logic instructions (e.g., commands), one or more algorithms, etc., for operating some or all of the ICS 20, and therefore to control various different systems and devices included as part of the well drilling platform. The stored instructions are not limited to any particular form (e.g., program files, system data, buffers, drivers, utilities, system programs, etc.) provided they can be executed by the controller 22; e.g., by the processor 34 included in the controller 22. The memory device 36 may be a non-transitory computer readable storage medium configured to store instructions that when executed by the processor, cause the processor to perform or cause the performance of certain functions or commands. The memory device 36 may be a single memory device or a plurality of memory devices. The memory device 36 may include a storage area network, network attached storage, as well as a disk drive, a read-only memory, random access memory, volatile memory, non-volatile memory, static memory, dynamic memory, flash memory, cache memory, and/or any device that stores digital information.

As indicated herein, the ICS controller 22 is configured to communicate with various systems and devices on the well drilling platform, and therefore includes whatever stored instructions are required to perform such communication. The aforesaid communications include data transfer to and from systems and/or devices on the well drilling platform. Non-limiting examples of protocols that can be used to for purposes of data transfer include Profibus, Digital, Analog, ASCII, profinet, Ethernet etc.

As indicated above, a well drilling platform may include a variety of different well platform systems 53 that participate in the well drilling process; e.g., an MPD system 38, a well control system 40, a diverter manifold 42, a PRV system 44, a rig manifold 46, etc. The specific configuration of each of these well platform systems 53, and how they are utilized, is often customized for the particular well drilling platform; e.g., to satisfy the requirements of the particular well being drilled. Non-limiting examples of these well platform systems 53, their functionality, and how they interact with one another are described below to illustrate the utility of the present ICS 20.

The ICS controller 22 includes logic (e.g., stored instructions, algorithms, etc.) that is applicable to the specific configuration of the well platform systems 53 of the particular well drilling platform with which the ICS 20 is utilized, and defines how the aforesaid well platform systems 53 interact (i.e., coordinate) with one another given a particular task to be completed or operational scenario that may occur. Hence, the ICS controller 22 logic (e.g., stored instructions, algorithms, etc.) is operable to cause the well platform systems 53 of the well drilling platform to assume coordinated respective configurations (i.e., coordinated states) that permit a function to be accomplished on the well drilling platform using the aforesaid well platform systems 53 using the ICS 20.

For example, as indicated above some well drilling platforms may include an MPD system 38 configured to monitor and control the annular pressure profile throughout the wellbore during the normal course of drilling; e.g., to maintain a substantially constant PBH during drilling. The MPD system 38 typically includes at least two MPD choke valves, one or more gate valves, one or more manifolds and may include a controller (i.e., an "MPD controller"). In the present ICS 20, choke valves may be controlled directly or indirectly by the ICS controller. For example, the ICS 20 will permit the operator to operate the MPD manifold; e.g., to reroute a fluid flow initially passing through a first choke valve and away from a second choke valve, subsequently through the second choke valve and away from the first choke valve—i.e., coordinate the states of the first and second choke valves. A person of skill in the art will recognize that the MPD manifold may be disposed in a variety of different configurations to accomplish the aforesaid rerouting.

The MPD system 38 can be operated to control the circulation of drilling fluids during normal drilling operations. The particular circulation path of the drilling fluids may be modified via the MPD manifold and valving (and possibly the diverter manifold 42 as well) to satisfy different operational scenarios/requirements; e.g., create a fluid flow path for drilling fluid to the MPD choke, or create a fluid flow path for return drilling fluid (that may include gas influxed during drilling, and/or cuttings produced during drilling) to a mud-gas separator (MGS) 47, or create a fluid flow path to a device 48 (e.g., a "mud shaker" or "cuttings separator system") configured to remove cuttings from the drilling fluid, or create a fluid flow path to a trip tank system 50 where fluid exiting the well can be stored and evaluated, etc. The MPD controller may be configured to execute stored instructions, to communicate with the ICS controller 22 (and vice versa), to receive and execute instructions from the ICS controller 22, and to send data (e.g., valve status, fluid pressure data, etc.) to the ICS controller 22. The ICS controller 22 can therefore alone or in combination with the MPD controller execute stored instructions that cause it to create a desired fluid flow path (e.g., actuate automated gate valves associated with the MPD system 38, automated valves associated with the diverter manifold 42, etc.). Hence, the ICS 20 is configured to permit the operator to selectively monitor and control the MPD system 38 from, for example, an ICS control station 24, 32 as will be explained below. The present ICS 20 is not limited to use with any particular MPD system 38.

As indicated above, well drilling platforms typically include a well control system 40. Such well control systems 40 may be configured to provide similar or the same functionality as the MPD system 38, but may be implemented as a redundant back up to the MPD system 38. In the event of a malfunction within the MPD system 38 or if it is desirable to bypass the MPD system 38, the well control system 40 can be operated to control the annular pressure profile throughout the wellbore. The well control system 40 may include at least two well control choke valves, one or more gate valves, one or more manifolds, and a well control system controller. In a manner similar to that described above vis-a-vis the MPD system 38, the well control system 40 may be configured to control the circulation of drilling fluids during drilling operations. The particular circulation path of the drilling fluids may be created via the well control manifold and valving (and possibly the diverter manifold 42 as well) to satisfy different operational scenarios/requirements (e.g., see scenarios described above with respect to the MPD system 38). In those instances wherein the well control system 40 includes a controller, the well control system controller may be configured to execute stored instructions, to communicate with the ICS controller 22 (and vice versa), to receive and execute instructions from the ICS controller 22, to send data (e.g., valve status, fluid pressure data, etc.) to the ICS controller 22, etc. The ICS controller 22 can therefore alone or in combination with the well control system controller execute stored instructions that cause it to create a desired fluid flow path (e.g., actuate automated gate valves associated with the well control system, automated valves associated with the diverter manifold, etc.). Hence, the ICS 20 may be configured to allow the operator to monitor and control the well control system 40, for example from an ICS control station 24, 32 as will be explained below. The present ICS 20 is not limited to use with any particular well control system 40.

As indicated above, most well drilling platforms include a diverter manifold 42 that may be configured to receive well fluids and permit the operator to selectively divert well fluid to a variety of different systems (e.g., a mud shaker 48 configured to separate mud from well cuttings, a flair where volatiles can be burned off, the MPD system 38, a trip tank system 50, a mud/gas separator 48, etc.) depending on the application at hand. The ICS controller 22 can, by executing stored instructions, create the desired fluid flow path on the well drilling platform (e.g., through the diverter manifold 42) by actuating automated valves (e.g., automated gate valves, etc.). The present ICS 20 is not limited to use with any particular diverter manifold 42.

As indicated above, most well drilling platforms includes a rig manifold 46 having a plurality of choke valves and gate valves that can be operated to reduce the fluid pressure at the well head in a controlled manner. Here again, the ICS controller 22 can, by executing stored instructions, cause the rig manifold 46 (e.g., via operation of the automated choke valves and gate valves, etc.) to, for example, reduce the fluid pressure at the well head in a controlled manner. The present ICS 20 is not limited to use with any particular rig manifold 46.

As indicated above, most well drilling platforms includes a mud pump system 52 for pumping the drilling fluid (i.e., the "mud"), which drilling fluid may include a mixture of fluids, solids and chemicals that is tailored to provide the correct physical and chemical characteristics required to safely drill the well. Here again, the ICS controller 22 can, by executing stored instructions, cause the mud pump system 52 (e.g., via operation of automated choke valves and pumps, etc.) to provide the drilling fluid at a predetermined pressure and flow rate. The present ICS 20 is not limited to use with any particular type of mud pump system 52.

As indicated above, most well drilling platforms includes a PRV system 44 that can be configured and operated to protect the mud pump system 52 and/or to maintain pressure within a well. A variety of different PRV systems 44 are available, each typically including a PRV, a hydraulic power unit (HPU) having one or more pumps (which may be powered by a pneumatic source available on the well drilling platform), a hydraulic fluid reservoir, one or more accumulators, one or more solenoid operated directional valves, gate valves, pressure sensors, etc. PRV systems 44 often include one or more PRV controllers dedicated to the PRV system 44. Here again, the ICS controller 22 alone or in combination with a PRV controller can provide the instructions necessary to produce the desired operation of the PRV system 44 and to receive information (e.g., valve status information, pressure data, etc.) from the PRV system 44. The present ICS 20 is not limited to use with any particular PRV system 44.

The ICS may also be in communication (e.g., receive/send information) with other systems or devices present on a well drilling platform that are not controlled by the ICS 20; i.e., independent systems 54, such as rig equipment, third party systems, etc. These independent systems 54 may provide information inputs to the ICS 20 (e.g., pressure values, temperature values, equipment status, etc.).

During operation of the well drilling platform, the ICS 20 permits the operator to centrally monitor and/or control the various different well platform systems 53 (e.g., like those described above, but not limited thereto) through the master control station 24; e.g., to cause the well platform systems 53 of the well drilling platform to assume coordinated respective configurations (i.e., coordinated states) that permit a function to be accomplished on the well drilling platform using the aforesaid well platform systems 53 using the ICS 20. As indicated above, the master control station 24 is configured to allow the operator to input instructions and information to the ICS controller 22 via an input device 26, and receive information from the ICS controller 22 via a display. To simplify the description below, the master control station 24 may be described in terms of an HMI configuration, but the master control station 24 is not limited thereto.

FIG. 1 diagrammatically illustrates an embodiment of the ICS controller 22 in direct or indirect communication with the various well platform systems 53 of the well drilling platform (e.g., including those well platform systems 53 described above), as well as independent systems 54 that are not controlled by the ICS 20. The communication (which may include data, commands, etc.) may be from the ICS controller 22 to the various well platform systems 53, from the various well platform systems 53 to the ICS controller 22, or both. The ICS controller 22 therefore receives information from the various well platform systems 53 regarding the status of particular devices, sensor data, and/or operational data (e.g., valve position or status, fluid flow rates, fluid volume in and out of the well, pressure data, temperature data, pump strokes for mud pumps, pit gain, ROP, differential pressure data for a mud-gas separator 47 (MGS), etc.), which data may upon receipt be stored within a memory device portion of the ICS controller 22.

To control one or more of the various well platform systems 53 of the well drilling platform, an operator may input information and/or commands into the ICS via the master control station 24, which input may be received by the ICS controller 22. Upon receipt of the operator input, the instructions stored within the memory device 36 of the ICS controller 22 may be executed and the processor 34 will cause a well platform system 53 within the well drilling platform to operate. For example upon receipt of the operator input, the instructions stored within the ICS controller 22 may operate devices (e.g., valves) within the MPD system 38 (and possibly the diverter manifold 42) to reroute fluid flow from a first fluid path through a first MPD choke valve to a second fluid path away from the first MPD choke valve and through a second MPD choke valve. As another example, upon receipt of the operator input, the instructions stored within the ICS controller 22 may open a fluid path (e.g., by automated valves) that allows drilling fluid exiting the well to pass through to a trip tank system 50 where the aforesaid drilling fluid may be evaluated. The trip tank system 50 may include sensors that indicate when the trip tank contains a sufficient amount of drilling fluid, which sensor input can be sent to the ICS controller 22. The instructions stored within the ICS controller 22 may cause the devices that created the fluid path to the trip tank system 50 to close and thereby prevent further fluid flow into the trip tank.

In addition to the ability of the ICS 20 to control one or more of the well platform systems 53 of the well drilling platform via operator input, the ICS controller 22 may be configured to automatically control one or more of the well platform systems 53 of the well drilling platform. For example, if sensors within the MPD system 38 indicate that a MPD choke valve is malfunctioning, the instructions stored within the ICS controller 22 (alone or in combination with the MPD controller) may, in response to the sensor input, operate devices (e.g., valves) within the MPD system 38 (and possibly the diverter manifold 42) to reroute fluid flow from a first fluid path through the malfunctioning MPD choke valve to a second fluid path away from the malfunctioning MPD choke valve and through a second back up MPD choke valve.

In both of these operational modes (i.e., a well platform system change in response to operator input, or an automated response), the ICS 20 has the stored input from the other various well platform systems 53 (e.g., pressure sensor input, valve status, valve position feedback, mud pump strokes, fluid volume into and out of the well, pit gain, etc.) regarding the then current status of the aforesaid other well platform systems 53 and therefore the knowledge regarding which if any of the other well platform systems 53 must be actuated or otherwise operationally altered to accomplish the desired operational change of the respective system. The instructions stored within the ICS controller 22 cause the ICS controller 22 to communicate the appropriate signals/communications to the appropriate well platform systems 53 to actuate or otherwise operationally alter to accomplish the desired operational change. In the prior art systems of which we are aware, the devices within the various systems on the well drilling platform (e.g., valves, etc.) must be operated at a system level (i.e., the operator must access and operate each well platform system 53 independently) in order to accomplish the desired function; e.g., redirect fluid to a MGS 47, to a trip tank system 50, etc. With the ICS 20, the operator can in a single location (e.g., at the ICS master control station 24) change the status of devices (e.g., valves) in a plurality of different well platform systems 53 to accomplish the aforesaid desired function. The ICS 20 therefore: 1) avoids the need to have an operator interact with each well platform system 53 independently, and potentially have to actuate or operationally actuate each necessary device; 2) provides coordination between the independent well platform systems 53 not possible under the prior art systems; and 3) provides a safety measure to ensure the proper steps are taken vis-a-vis the stored instructions.

The ICS controller 22 may also assist with a change of process identification as well. For example, when the well drilling platform is in a first operational mode, the need to change or modify the operational mode may arise based on received/monitored operational parameters. In such a scenario, the ICS controller 22 may be configured to produce an alert at the master control station 24 (visual and/or audible). Upon receiving the alert, the operator may use the alert information to take action; e.g., actuate/transition well platform systems 53 on the well drilling platform. For example, when the MPD system 38 is operating to control the well drilling platform, the MPD choke is typically utilized to control well pressures. In this scenario, the ICS controller 22 includes logic that may cause the system to monitor certain operational parameters. If the ICS controller 22 detects that a kick is being experienced within the well, the ICS controller 22 may alert the operator to take action. Alternatively or in combination, stored instructions may cause the ICS controller 22 to automatically actuate other well platform systems to safely handle the kick.

A change in well drilling scenario may make it useful to change one or more set point pressures within the PRV system 44 used for surface drilling equipment (mud pump, riser etc.). Instead of using an independent PRV system 44 (as is typically required with prior art systems), the ICS controller 22 may include stored instructions that allow the ICS controller 22 (alone or in combination with a PRV system controller) to adjust PRV set pressures. In this scenario, changes to PRV system 44 set pressures can be made at the master control station 24 of the ICS 20. Similarly, a change in well drilling scenario may make it useful to change one or more set point pressures for the MPD chokes within the MPD system. Instead of using an independent MPD system 38, the ICS controller 22 may include stored instructions that allow the ICS controller 22 (alone or in combination with a MPD system controller) to adjust MPD set pressures. In this scenario, changes to MPD choke set pressures can be made at the master control station 24 of the ICS 20. As yet further examples, the ICS controller 22 may include stored instructions that allow the ICS controller 22 to adjust the well control choke(s) and rig choke manifold at a single location.

As another example of the capability of the ICS 20, the stored instructions within the ICS controller 22 can cause the ICS 20 to actuate well platform systems 53 (or portions thereof) in a predetermined sequential manner, and thereby avoid the need to actuate (e.g., open or close) a series of valves one by one, which valves may be present in different systems. Hence, this is another example wherein with the ICS 20, the operator can in a single location (e.g., at the ICS master control station 24) change the status of devices (e.g., valves) in a plurality of different well platform systems 53 to accomplish the aforesaid desired function. The stored instructions in the ICS controller 22 may also include the capability to stop a particular function or to provide an error/failure indication if, for example, a particular valve in the sequence is malfunctioning (e.g., a valve required to be in an open state for a particular function is unable to be opened, or is not open for any reason). The ability of the ICS 20 to centrally control a number of independent well platform systems 53 on the well drilling platform also provides the operator with the ability to monitor and utilize coordinated well platform system 53 operation; e.g., apply interlocks, where when a certain valve is open, another valve should be in closed position and vice versa. Hence, the ICS 20 can provide additional safety capability. As an example of sequential operation possible with the present ICS 20, under certain circumstances it may be desirable to divert some amount (or all) fluid flow from the well to a MGS 47. In that instance, the operator may select a MGS mode on the master control HMI 30. Upon receiving the operator input to initiate the MGS mode, the stored instructions may cause the ICS controller 22 to automatically sequence particular valves to open and close to redirect the fluid flow within the diverter manifold 42 to pass to the MGS 47. As another example, under certain circumstances it may be desirable to divert some amount (or all) fluid flow from the well to a trip tank system 50. To accomplish that task, the operator may select a trip tank mode on the master control station 24. Upon receiving the operator input to initiate the trip tank mode, the stored instructions will cause the ICS controller 22 to automatically sequence the requisite valves in the diverter manifold 42, the MPD manifold, and other miscellaneous valves to open and close to redirect the fluid flow to pass to the trip tank system 50.

Figure 2:
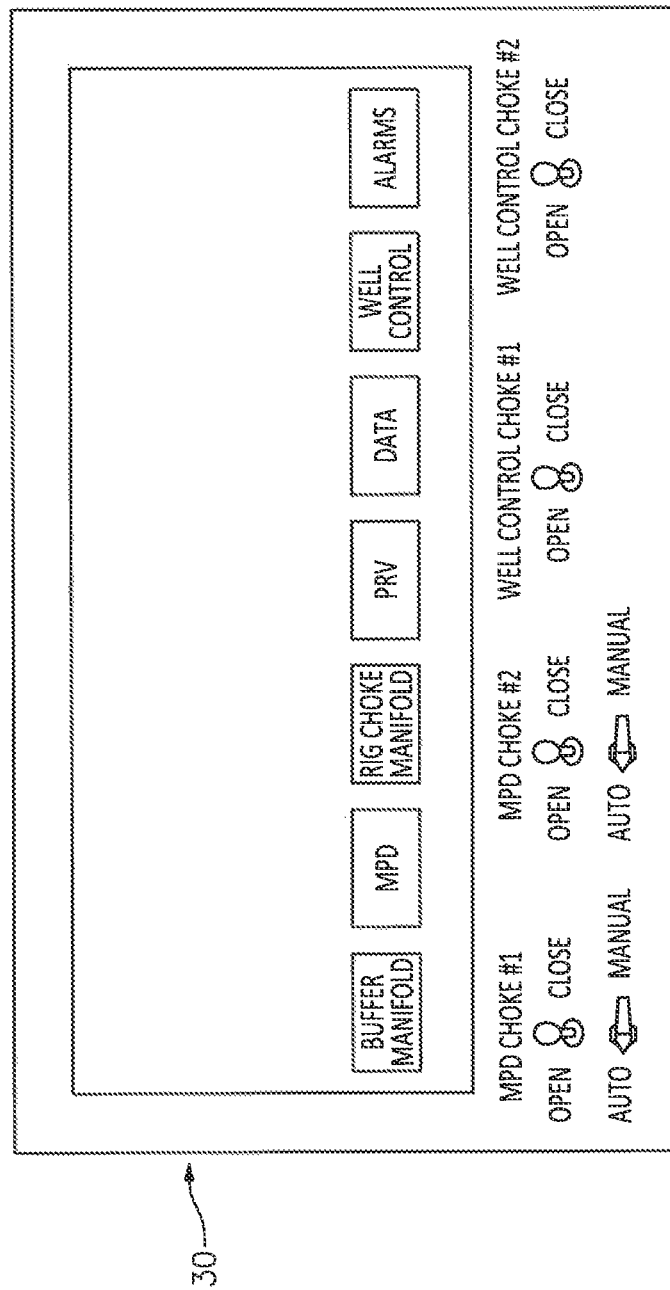
FIG. 2 is a diagrammatic illustration of a master control station embodiment.

The ICS master control station 24 can be configured in a variety of different ways, and can be customized to suit particular applications. For example, FIG. 2 provides a diagrammatic illustration of a master control station 24 embodiment that includes a plurality of mechanical control devices (e.g., joysticks and switches) and a touch screen type HMI display. The HMI display screen may be configured to provide predetermined types of information to the operator (e.g., MPD choke valve status and/or well control choke valve status), operational indicators (e.g., indicators of normal operation or warning indicators for abnormal operation, etc.), and GUI buttons that the operator can actuate via the HMI touch screen. In the exemplary HMI display screen shown in FIG. 2, the GUI buttons allow the operator to pop up different HMI screens that may be relevant to specific well platform systems 53 of the well drilling platform (e.g., the diagrammatic representation in FIG. 2 shows GUI buttons for "Buffer Manifold", "MPD", "Rig Choke Manifold", "PRV", "Data", "Well Control", and "Alarms"). The diagrammatic representation in FIG. 2 is a non-limiting example of an HMI version of a master control station 24.

Figure 3:
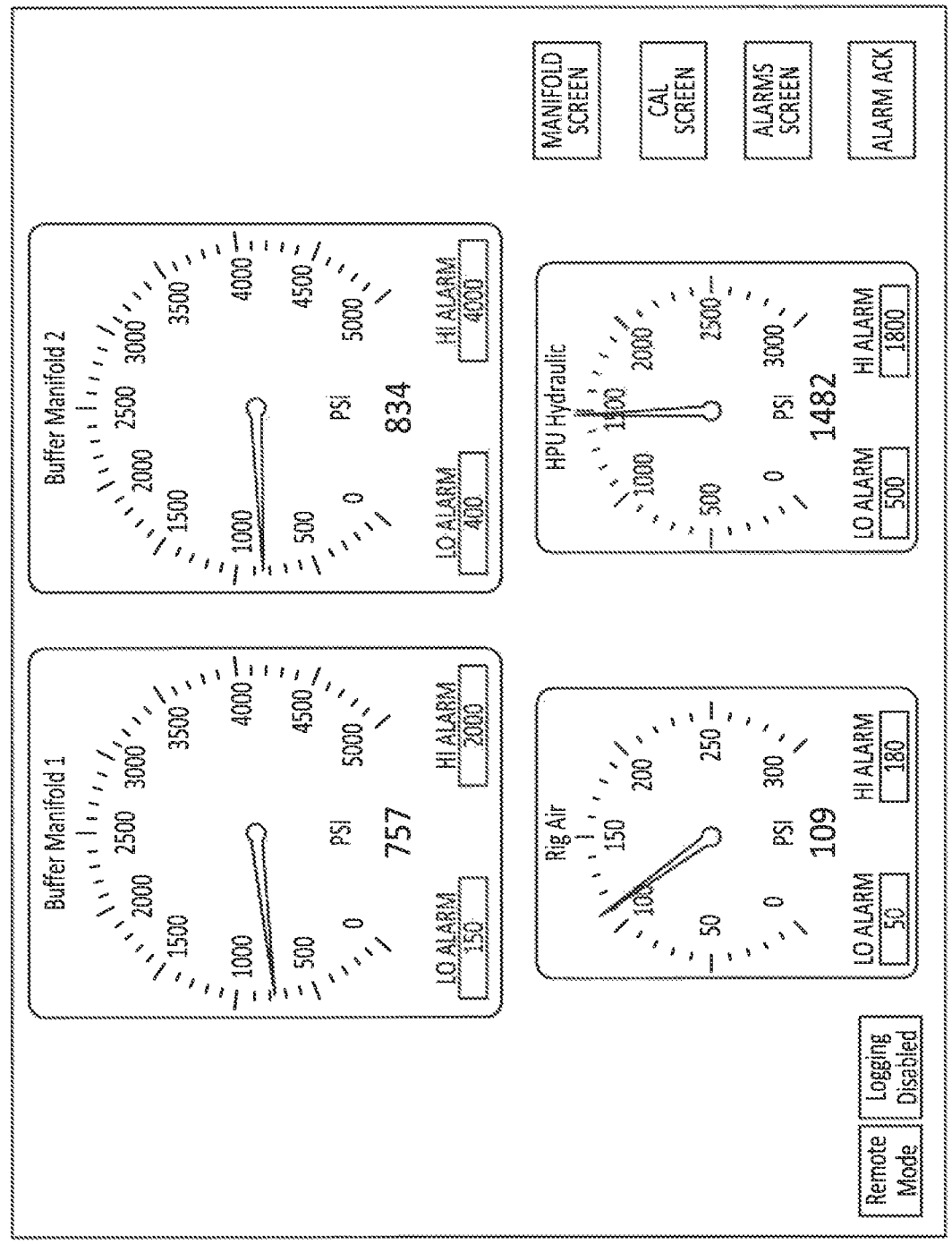
FIG. 3 is a diagrammatic illustration of a "Buffer Manifold" HMI display screen embodiment.

FIG. 3 is a diagrammatic representation of a "Buffer Manifold" HMI display screen that can be accessed by the operator actuating the GUI button for "Buffer Manifold" on the main control station 24 HMI screen. This example of a "Buffer Manifold" display screen (i.e., a diverter manifold screen) includes a "Buffer Manifold I" pressure display indicating the sensed fluid pressure within a first buffer/diverter manifold, a "Buffer Manifold 2" pressure display indicating the sensed fluid pressure within a second buffer/diverter manifold, a "Rig Air" pressure display indicating the sensed air pressure from a pneumatic air source on the well drilling platform, and a "HPU Hydraulic" pressure display indicating the sensed hydraulic fluid pressure produced by a hydraulic power unit (e.g., a hydraulic power unit portion of the PRV system). Additional GUI buttons are shown that can be actuated by the operator to change HMI screens (e.g., change to a manifold screen, a calibration screen, an alarms screen, etc.), or to acknowledge an alarm, or to permit remote operation of the ICS 20 and a secondary control station 32 HMI located elsewhere on the well drilling platform, or to disable logging. This exemplary manifold HMI screen could be used as a template for other manifolds; e.g., MPD manifolds, well control system manifolds, etc.

Figure 4A:
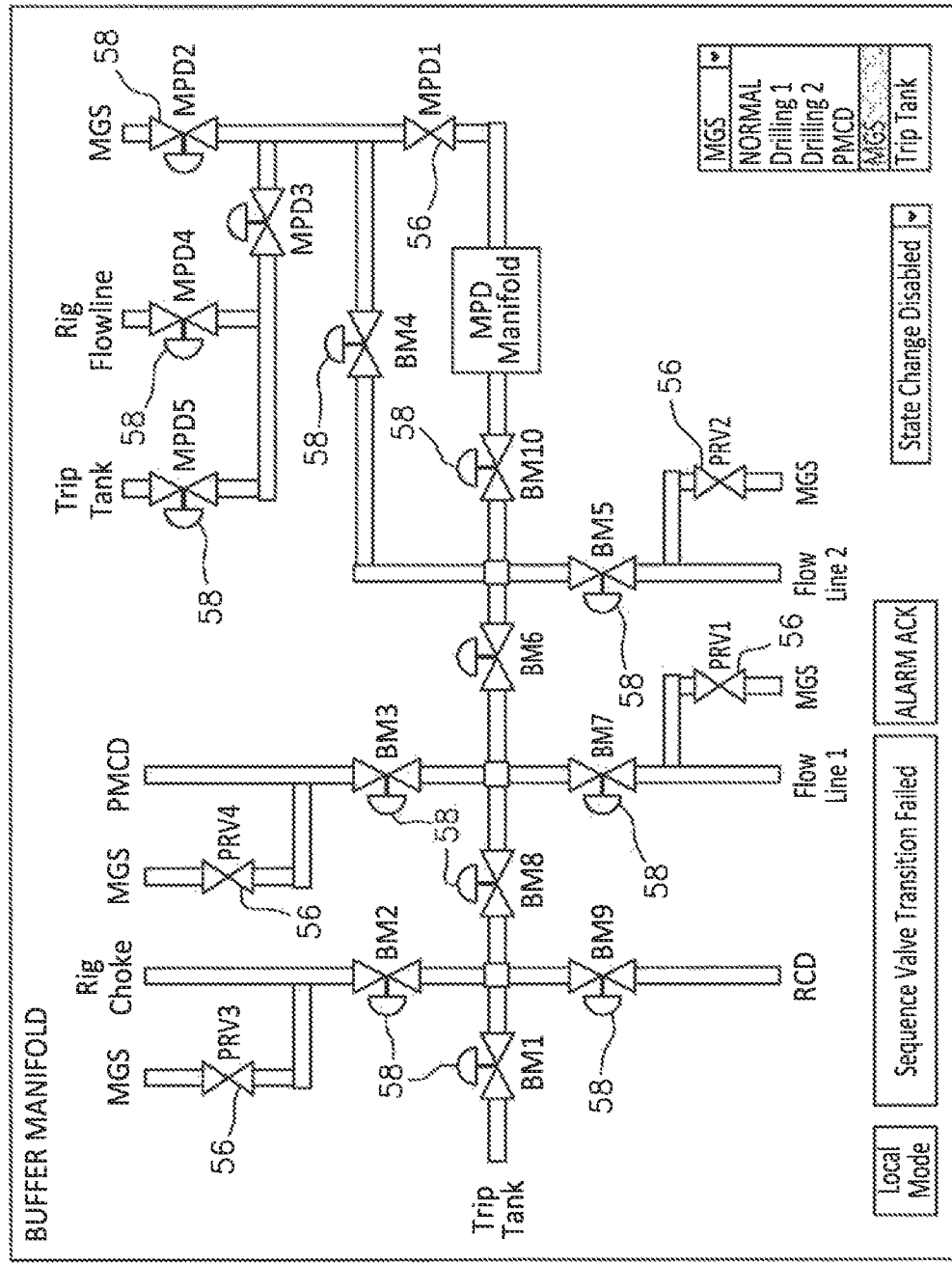
FIG. 4A is a diagrammatic illustration of a Buffer Manifold screen layout embodiment.
Figure 4B:
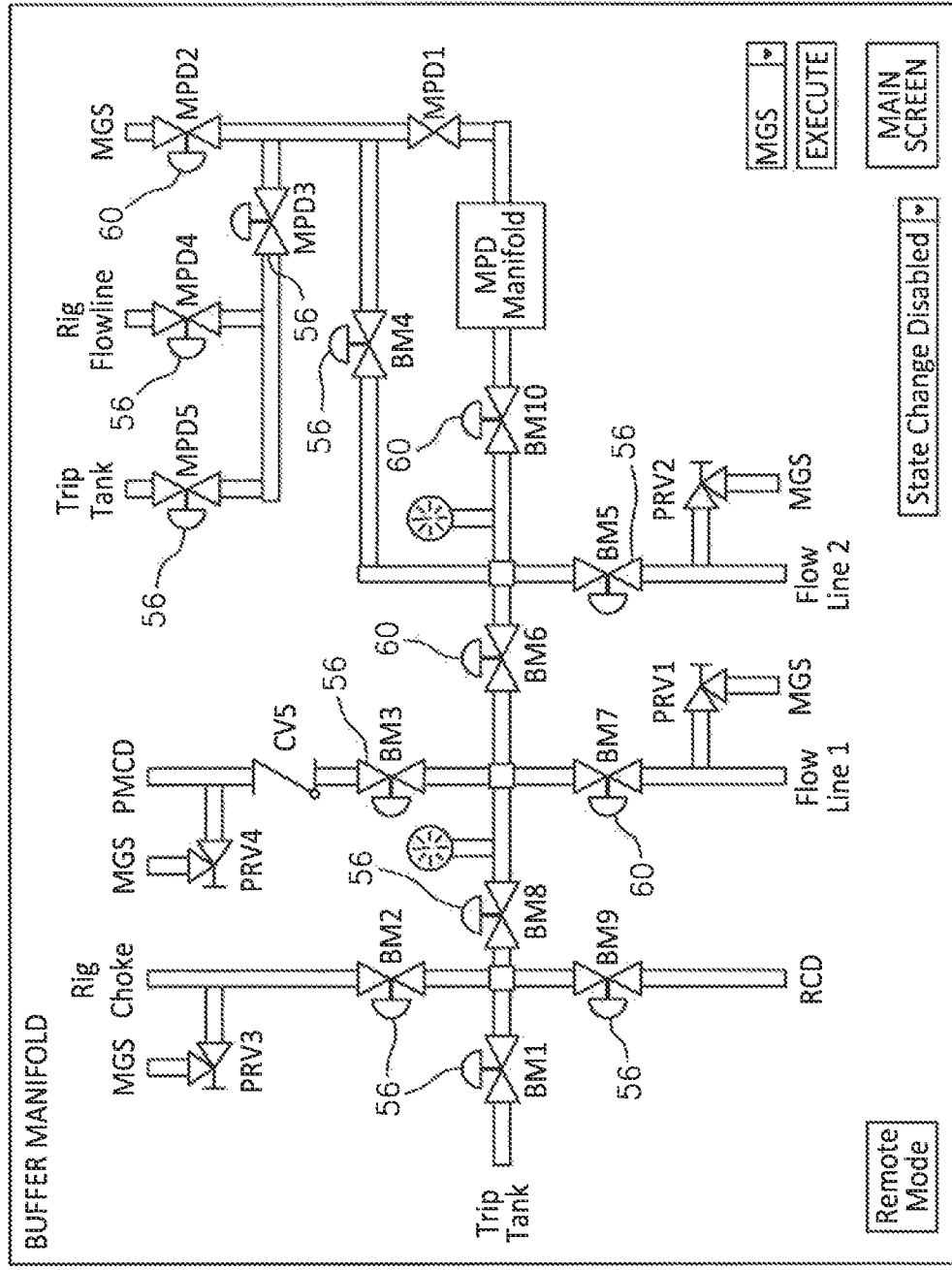
FIG. 4B is a diagrammatic illustration of the Buffer Manifold screen layout embodiment shown in FIG. 4A, with an implemented functionality.

FIGS. 4A and 4B are diagrammatic illustrations of a Buffer Manifold screen layout diagrammatically illustrating the valves associated with the buffer manifold (i.e., diverter manifold 42) and the fluid flow paths associated therewith. In FIG. 4A, the selection screen in the lower right hand corner allows the operator to choose a valve sequencing for a particular function (e.g., MGS, Normal, Drilling 1, Drilling 2, PMCD, MGS, and Trip Tank). In this example, the MGS routing function is highlighted but not yet selected. Valves 56 shown with first visual indicator (e.g., in red color) on the HMI display are indicated as closed, and valves 58 shown with a second visual indicator (e.g., in yellow color) are in transition. In FIG. 4B, the operator has chosen the valve sequencing to permit fluid flow to the MGS 47, as indicated in the selection screen in the lower right hand corner. Valves 56 shown with the first visual indicator (e.g., the color red) on the HMI display are indicated as closed and valves 60 shown with third visual indicator (e.g., in green color) are open, illustrating a fluid flow path from Flow Line I to the MGS 57 via the MPD manifold. Hence, the operator is able to see and control the status of valves and the consequent fluid path in and through a plurality of different systems and devices on the well control platform at a single location.

Figure 5:
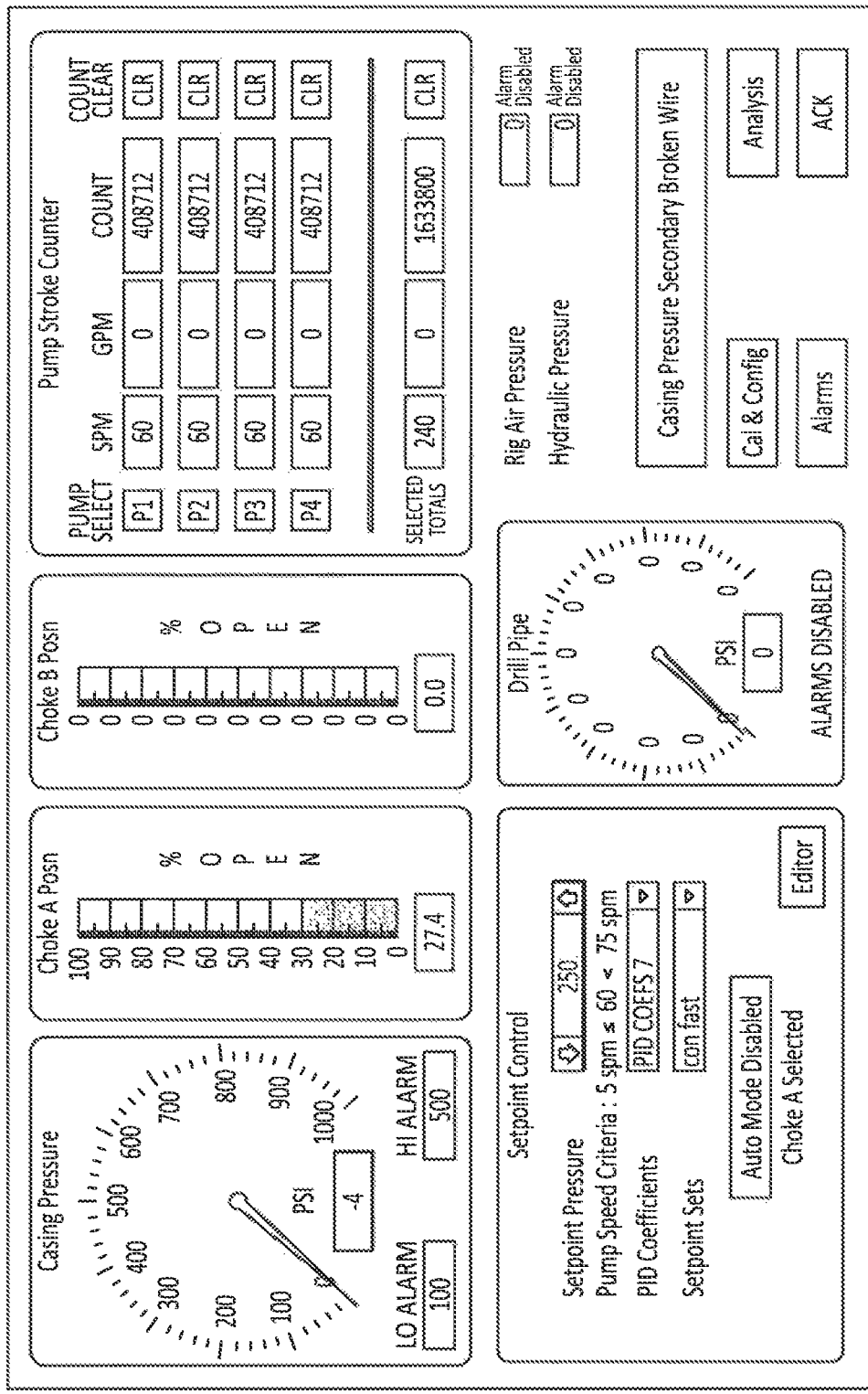
FIG. 5 is a diagrammatic illustration of an HMI MPD Main Screen display layout embodiment.

FIG. 5 is a diagrammatic illustration of an exemplary HMI MPD Main Screen display layout including a Casing Pressure indicator, a Choke A position indicator, a Choke B position indicator, a Pump Stroke Counter indicator, a Setpoint Control indicator, a Drill Pipe indicator, a Rig Air Pressure indicator, a Hydraulic Pressure indicator, an alarm indicator, and GUI buttons for "Cal & Config", Alarms, Analysis, and ACK. The Casing Pressure indicator visually provides a fluid pressure value in the well casing, and also indicates the high and low alarm pressure presets. Hence, pressure sensors within the well casing send signals to the ICS controller 22 which interprets the signals and displays pressure values associated with the aforesaid sensor signals. The Choke A and Choke B position indicators indicate the percentage that each respective MPD choke valve is open (i.e., Choke A is indicated as 27.4% open, and Choke B is indicated as closed). The percentage that the choke valves are open may be detected by positional sensors in communication with the respective choke valve, which positional sensors send signals to the ICS controller 22 which interprets the signals and displays the positional data. The Pump Stroke Counter indicator visually displays the strokes per minute ("SPM") and the total count of pump strokes for one or more mud pumps used on the well drilling platform. In this example, the data from four different mud pumps (P1, P2, P3, and P4) is displayed. The pump stroke data is provided to the ICS controller 22 from the Mud Pump system. The ICS controller 22 interprets the data and displays the data on the HMI display screen for each of the respective mud pumps. The Setpoint Control indicator visually provides setpoint pressure data based on a mud pump operation criteria, and provides a means for displaying and changing operational settings to suit the need at hand. The Drill Pipe indicator visually provides a fluid pressure value within the drill pipe. Pressure sensors send signals to the ICS controller 22 which interprets the signals and displays drill pipe pressure values associated with the aforesaid sensor signals. The Rig Air Pressure indicator visually provides an air pressure value for the air provided by the pneumatic pressure source on the well drilling platform (the PRV system may utilize pneumatic air to power pumps, etc.). Pressure sensors send signals to the ICS controller 22 which interprets the signals and rig air pressure values associated with the aforesaid sensor signals. The Hydraulic Pressure indicator visually provides a fluid pressure value for hydraulic fluid; e.g., hydraulic fluid pressure within the PRV system 44. Pressure sensors send signals to the ICS controller 22 which interprets the signals and rig air pressure values associated with the aforesaid sensor signals. The GUI button for "Cal & Config" provides a means by which an operator can enter into a calibration and configuration HMI screen to access and modify calibration and configuration data and settings. The GUI button for "Alarms" provides a means by which an operator can enter into an alarms HMI screen to access alarm data and include the ability to modify alarm settings. The GUI button for "Analysis" provides a means by which an operator can enter into an analysis HMI screen to access certain types of analysis data (e.g., pertaining to fluid flow or well drilling performance data, etc.), or may provide a means by which an operator can input commands to the ICS controller 22 to perform certain analyses.

Figure 6:
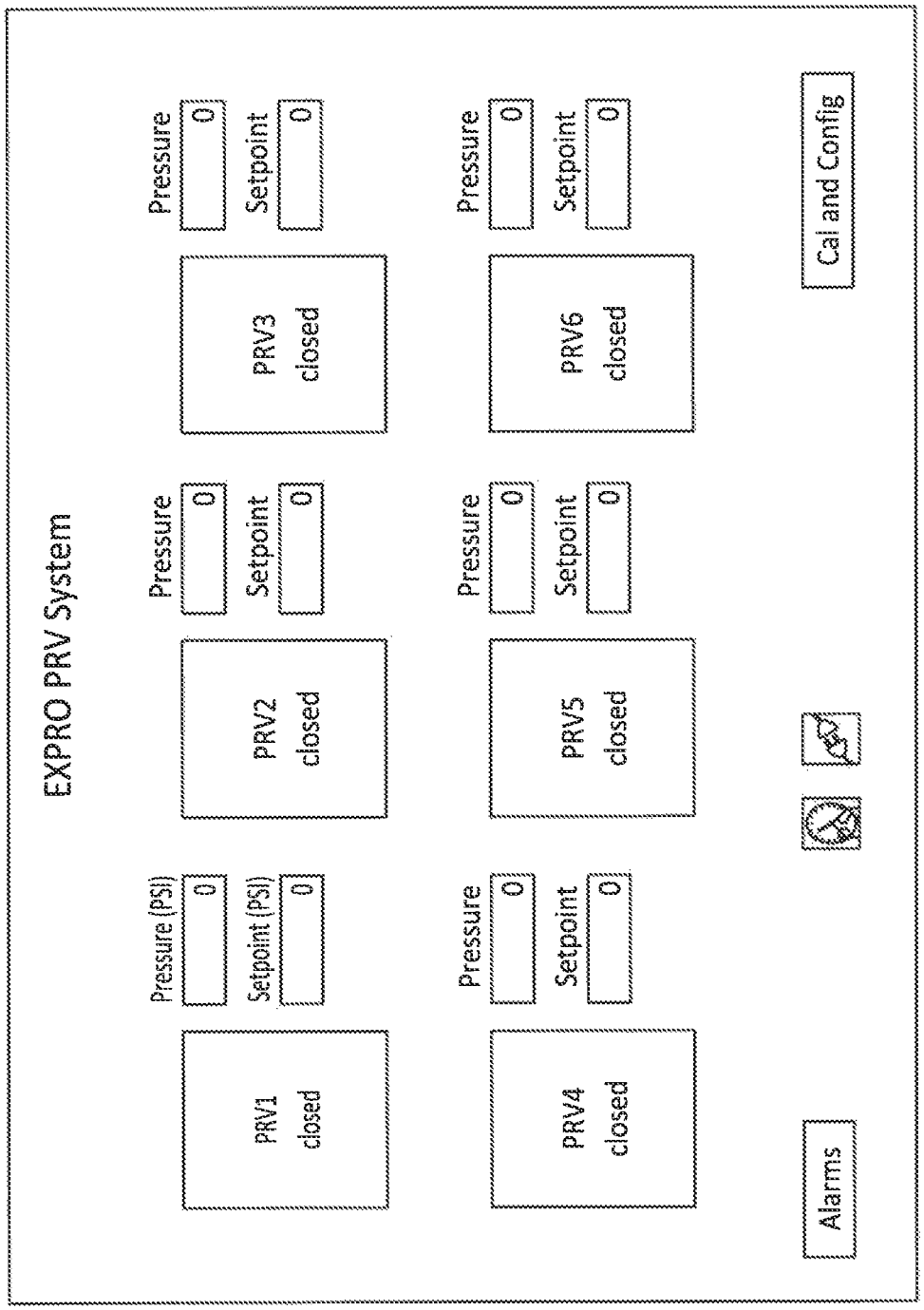
FIG. 6 is a diagrammatic illustration of a PRV display layout embodiment.

FIG. 6 is a diagrammatic illustration of an exemplary PRV display layout including a plurality of PRV displays, and Alarm GUI button, and a Cal & Config GUI button. Each PRV display includes an open/closed indicator, a pressure value indicator and a setpoint indicator. The GUI button for "Cal & Config" provides a means by which an operator can enter into a calibration and configuration HMI screen to access and modify calibration and configuration data and settings for a respective PRV.

In some embodiments, the present disclosure may be configured to communicate with the ICS 20 (including the ICS controller 22) from one or more sites located remote from a well drilling platform using a remote communication unit (RCU). These RCU 132 are in selective electronic communication with the ICS 20. The electronic communication may be via a wireless network, or a wired connection, or some combination thereof. A non-limiting example of a wired communication is an electronic communication that travels through a physical communication medium (e.g., a "wire") to and from an Internet source, or via a dedicated network; e.g., a wired Ethernet cable communication, or other wired connectivity that would permit a communication between Internet protocol addresses ("IP Addresses"). A non-limiting example of a wireless communication is one that travels at least in part through a medium (e.g., air) other than a physical communication medium; e.g., cellular communications, Bluetooth communications, radio communications, etc. In some embodiments, communications between an RCU 132 and the ICS 20 utilize a gateway structure that enables electronic communications there between (and may also monitor and/or limit communications). In some embodiments, an RCU 132 may be configured for communication with the ICS 20 via a virtual private network (VPN), or a private physical network (PPN), or other secure communications mechanism. The communications may include data transfer (e.g., as described above), using protocols such as but not limited to Profibus, Digital, Analog, ASCII, profinet, Ethernet etc.

An RCU 132 may be any one of a variety different types of devices capable of electronically communicating with the ICS 20; e.g., a desktop computer, a laptop computer, a tablet, a smart phone, etc.

In those embodiments of the present disclosure that include one or more RCU 132 in communication with the ICS 20 (as well as any other embodiment of the present disclosure), the ICS 20 may be configured to communicate operational data (e.g., set point values, choke positions, pump strokes, fluid pressure values, valve status, etc.) to one or more data storage devices 136 located remote from the well platform. A data storage device 136 may take a variety of different forms (for example, see those described above in regards to memory device 36), and the present disclosure is not limited to any particular type of storage or memory device. In some embodiments, the operational data may be communicated to a cloud based storage device or system (e.g., by the ICS 20) and subsequently stored within the cloud based data storage device or system. The data storage device(s) located remote from the well platform (including a cloud based system) may be accessible from an RCU 132. The aforesaid remotely located data storage device may make operational data readily accessible, and thereby avoid the need (and time required) to download operational data by an operator remotely located from the well drilling platform.

An RCU 132 may be configured with the same or similar functionality as that described above with respect to a secondary control station 32 and/or a master control station 24. For example, in some embodiments an RCU 132 may be configured to only receive and display information received directly or indirectly from the ICS 20; e.g., information viewing capabilities and no ability to edit or modify operational parameters. As an example, an RCU 132 in the form of a smart phone or tablet may be configured to receive information from the ICS 20 via a cellular network (but not send a return communication) regarding operational alarms, operational updates, system status, etc.; e.g., via a text message, an email, or the like. As another example, an RCD 132 in the form of a computer may be configured to receive emails or other messaging from the ICS 20 via the Internet regarding operational alarms, operational updates, system status, etc. In some embodiments, an RCU 132 may be configured to be directly connectable to the ICS 20; e.g., by a portal associated with the ICS 20, or by a VPN connection, etc. In those embodiments wherein an RCU 132 is configured to be directly connectable to the ICS 20, the RCU 132 may be configured to display HMI display screens such as, but not limited to, those described above and shown in FIGS. 2-6. Once the RCU 132 is connected to the ICS 20, the operator may then acquire additional information regarding the subject matter of an initial communication (e.g., the text, or email, etc.) by accessing the various HMI display screens. The present disclosure is not limited to an RCU 132 having a configuration that is the same as that described above with respect to a secondary control station 32 and/or a master control station 24. The present disclosure includes alternative RCU 132 configurations capable to receive and display information from the ICS 20.

In addition to being configured to receive and display information received directly or indirectly from the ICS 20 as described above, in some embodiments an RCU 132 may also be configured so that a remotely located operator may input control commands to the ICS 20 via an RCU 132; e.g., an ability to edit or modify operational parameters. As an example, an RCU 132 in the form of a smart phone, tablet, desk-top computer, or laptop computer (or the like) may be configured to be directly connectable to the ICS 20; e.g., by a portal associated with the ICS 20, or by a VPN connection, etc. In those embodiments wherein an RCU 132 is configured to be directly connectable to the ICS 20, the RCU 132 may be configured to connect into one or more portions of the ICS 20 that provides operational control of the ICS 20; e.g., connect into the ICS 20 HMI display screens such as, but not limited to, those described above and shown in FIGS. 2-6. In these embodiments wherein the RCU 132 is configured so that an operator may input control commands to the ICS 20, the RCU 132 may function in a manner the same as or similar to that described above in regards to an ICS master control station 24 or a secondary control station 32; e.g., change set point values, choke positions, valve status, etc. The present disclosure is not limited to an RCU 132 having a configuration that is the same as that described above with respect to a secondary control station 32 or a master control station 24; i.e., the present disclosure contemplates alternative RCU 132 configurations capable to both receive and display information from the ICS 20, and to input control commands to the ICS 20.

In some embodiments, communications with the ICS 20 may be accomplished using more than one RCU 132. For example in the event of an alarm being tripped on the well drilling platform, the ICS 132 may be configured to send a communication (e.g., a text message, or email, etc.) to a first RCU 132 (e.g., a smart phone, a tablet, etc.) to alert an operator, and the operator may then use a second RCU 132 (e.g., a smart phone, a tablet, a computer) to connect to the ICS 20 (e.g., via a portal associated with the ICS 20, or by a VPN connection, etc.). Once connected, the operator can access the one or more portions of the ICS 20 that provides operational control of the ICS 20; e.g., connect into the ICS 20 HMI display screens such as, but not limited to, those described above and shown in FIGS. 2-6.

In some embodiments, communications with the ICS 20 may be accomplished using a single RCU 132 that possesses multiple functionalities. For example in the event of an alarm being tripped on the well platform, the ICS 20 may be configured to send a communication (e.g., a text message, or email, etc.) to the RCU 132 (e.g., a smart phone, a tablet, computer, etc.) to alert an operator. The operator may then access a different functionality of the same RCU 132 to connect to the ICS 20 (e.g., via a portal associated with the ICS 20, or by a VPN connection, etc.). Once connected, the operator can access the one or more portions of the ICS 20 that provides operational control of the ICS 20; e.g., connect into the ICS 20 HMI display screens such as, but not limited to, those described above and shown in FIGS. 2-6.

Similar to a secondary control station 32, the configuration and capabilities of an RCE 32 may depend on privileges assigned to that RCU 132 (as opposed to the functional capability of the RCU 132). For example, an RCU 132 may be assigned privileges that only permit it to receive and display information received directly or indirectly from the ICS 20, or receive and display only certain types of information from the ICS 20. Alternatively, an RCU 132 may be assigned privileges that permit it to both receive and display information received directly or indirectly from the ICS 20, and to permit an operator to input control commands to the ICS 20, including the various well platform components and systems in communication with the ICS 20. Depending on the assigned privileges, the RCU 132 may permit an operator to input control commands to the ICS 20, including the various well platform systems 53 in communication with the ICS 20.

The following examples are provided to illustrate the utility of a well platform control system that is configured to permit communication with one or more RCU 132 as described above.

As indicated above, some well drilling platforms may include an MPD system 38 configured to monitor and control the annular pressure profile throughout the wellbore during the normal course of drilling; e.g., to maintain a substantially constant PBH during drilling. The MPD system 38 typically includes at least two MPD choke valves, one or more gate valves, one or more manifolds, etc. The ICS 20 (including the ICS controller 22) may be configured to permit an operator to directly or indirectly control components within the MPD system 38. For example, for a variety of different reasons it may be desirable to reroute a fluid flow then currently passing through a first choke valve and away from a second choke valve, to subsequently pass through the second choke valve and away from the first choke valve (e.g., to change the trim setting of the choke, to bypass a choke that may be at least partially compromised by debris, to enable choke maintenance, etc.). Specific non-limiting examples of reasons for switching chokes include an exceeded well pressure threshold (e.g., that trips an alarm), or choke performance data, or a drilling position within a pressure window of the well, or a choke maintenance schedule, or the like.

Embodiments of the present disclosure that include a well platform control system configured to permit communication with one or more RCU 132 as described above, may permit an operator located remote from the well drilling platform to identify and/or act with respect to these operational scenarios. For example, in the event a well pressure threshold is exceeded and an alarm is tripped, the well platform control system (e.g., ICS 20) may send a communication to an RCU 132 alerting a remote operator of the alarm. Upon receipt of the alarm by the RCU 132, the remotely located operator may: 1) establish direct communications with the ICS 20, review operational data in real time via ICS 20 HMI display screens, and communicate instructions to switch fluid flow from the first choke valve to the second choke valve; 2) establish communications with a remotely located data storage device 136 (e.g., a cloud based storage device), review the remotely stored operational data, establish direct communications with the ICS 20 and communicate operational instructions to the ICS 20 (e.g., switch fluid flow from the first choke valve to the second choke valve); or the like. As another example, the well platform control system (e.g., ICS 20) may send a communication to an RCU 132 regarding scheduled action items (that do not involve an alarm trip) that may require the operator to reroute fluid flow from a first choke valve to a second choke valve. Upon receipt of the action item communication by the RCU 132, the remotely located operator may then establish direct communications with the ICS 20 via the RCU 132 and communicate instructions to switch fluid flow from the first choke valve to the second choke valve. As yet another example, an operator remotely located from the well drilling platform may establish communications with a remotely located data storage device 136 (e.g., a cloud based storage device). Upon reviewing the remotely stored operational data, the remotely located operator may then establish direct communications with the ICS 20 via the RCU 132 and communicate instructions to switch fluid flow from the first choke valve to the second choke valve. As stated above, these examples are non-limiting and are provided to illustrate the utility of the present disclosure. The action of changing fluid flow from a first choke valve to a second choke valve is exemplary and the present disclosure is not limited thereto.

As yet another example, an operator remotely located from the well drilling platform may establish communications with a remotely located data storage device 136 (e.g., a cloud based data storage device) or may establish direct communications with the ICS 20 via an RCU 132 for the purpose of reviewing operational data. Upon reviewing the operational data, the remotely located operator may then submit instructions to the ICS 20 via the RCU 132 to change the circulation path of drilling fluids (e.g., actuate automated gate valves associated with a diverter manifold 42, etc. to create a fluid flow path for return drilling fluid to a mud-gas separator (MGS) 47, or to a device 48 (e.g., a "mud shaker" or "cuttings separator system") configured to remove cuttings from the drilling fluid, or to a trip tank system 50 where fluid exiting the well can be stored and evaluated, etc.), or actuate a flair where volatiles can be burned off, etc.

As yet another example, an operator remotely located from the well drilling platform may establish communications with the ICS 20 via an RCU 132 for the purpose of changing operational parameters of a PRV system 44. During a drilling operation it may be desirable to modify operational parameters of a PRV system 44 in view of changing well characteristics.

The above examples are provided to illustrate the utility of a well platform control system that is configured to permit communication with one or more RCU 132 and the present disclosure is not limited to an RCU 132 configured to perform these specific examples.

It can be seen from the above description that the present disclosure regarding a well platform control system that is configured to permit communication with one or more RCU 132 provides numerous advantages. As a further example, in some instances operators may not be present on a well drilling platform twenty-four hours a day (24 hrs/day). In these instances, an operator remotely located from the well drilling platform that utilizes a well platform control system (e.g., ICS 20) that is configured to permit communication with one or more RCU 132 (i.e., an "RCU enabled well platform control system") as described above can provide desirable oversight of the well drilling platform. Furthermore, a remotely located operator may provide oversight to a plurality of unmanned well drilling platforms having RCU enabled well platform control systems thereby providing desirable efficiency and cost savings. As a further example, it will be recognized that an operator having the requisite skill set and training to oversee operations of a well platform may have a different, more extensive skill set (e.g., an "operational skill set") than other operators present on a well platform. In these instances, a single operator having the aforesaid operational skill set may be remotely located from a plurality of well drilling platforms having an RCU enabled well platform control system and can provide desirable oversight of each of the well drilling platforms via the respective RCU enabled well platform control system thereby providing desirable efficiency and cost savings.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed herein as the best mode contemplated for carrying out this invention.

What is claimed is:

1. A control system for a well drilling platform, the well drilling platform having a plurality of well platform systems, the control system comprising:
    a first control station located at a well drilling platform and a second control station located at a location remote from the first control station, the first control station and the second control 5 station each comprising a respective human machine interface (HMI) including at least one input device and at least one display device; and
    a controller located at the well drilling platform, the controller in communication with the well platform systems, the controller having at least one processor that executes instructions, and a memory device that is coupled to the at least one processor and that stores the instructions that, 10 when executed by the at least one processor, cause the controller to selectively communicate with one or more of the well platform systems to receive information from the respective one or more well platform systems and to selectively send system control commands to the respective one or more well platform systems; and
    wherein the control system is configurable in a first configuration and in a second configuration, wherein:
        in the first configuration the first control station is configured as a master control station to permit an operator to send input commands to the controller and to display information from the controller, and the second control station is subordinate to the master control station, and as a subordinate the second control station is configured to display information from the controller and does not permit the operator to send all of the input commands to the controller possible from the master control station; and
        in the second configuration the second control station is configured as the master control station to permit the operator to send input commands to the controller and to display information from the controller, and the first control station is subordinate to the master control station, and as the subordinate the first control station is configured to display information from the controller and does not permit the operator to send all of the input commands to the controller possible from the master control station, further including a plurality of security profiles stored in the controller; and wherein a first group of the plurality of security profiles enable selectively changing the configuration of the control system to designate which of the control stations is configured as the master control station; and wherein a second group of the plurality of security profiles does not enable changing the configuration of the control system to designate which of the control stations is configured as the master control station.

2. The control system of claim 1, wherein at least some of the plurality of security profiles are associated with respective operators.

3. The control system of claim 1, wherein at least some of the plurality of security profiles are associated with respective well drilling processes.

4. The control system of claim 3, wherein a third group of the plurality of security profiles enable changing the configuration of the control system to designate which of the control stations is configured as the master control station during the respective well drilling process.

5. The control system of claim 1, wherein the location remote from the first control station at which the second control station is located is at the well drilling platform.

6. The control system of claim 1, wherein the location remote from the first control station at which the second control station is located is a site remote from the well drilling platform.

7. The control system of claim 1, further comprising a remote communication unit (RCU) located remote from the well drilling platform; and
    wherein the controller and the RCU are configured to selectively electronically communicate with one another information relating to at least one of the well platform systems.

8. The control system of claim 7, wherein the RCU is configured as one of the first and second control stations.

9. The control system of claim 7, wherein the controller and the RCU are configured to selectively communicate with one another by a wireless connection.

10. The control system of claim 9, wherein the controller is configured to selectively communicate with the RCU by email or text message.

11. The control system of claim 7, wherein the RCU is configured to selectively communicate an RCU control command to the controller; and
    upon receipt of the RCU control command, the instructions cause the controller to communicate with the one or more well platform systems based on the received RCU control command.

12. A method of controlling a well drilling platform, the well drilling platform having a plurality of well platform systems, the method comprising:
- providing a first control station located at a well drilling platform and a second control station located at a location remote from the first control station, the first control station and the second control station each comprising a respective human machine interface (HMI) including at least one input device and at least one display device;
- providing a controller located at the well drilling platform, the controller in communication with the well platform systems, the controller having at least one processor that executes instructions, and a memory device that is coupled to the at least one processor and that stores the instructions;
- wherein the first control station and the second control station are configurable in a first configuration and in a second configuration, wherein:
  - in the first configuration the first control station is configured as a master control station to permit an operator to send input commands to the controller and to display information from the controller, and the second control station is subordinate to the master control station, and as a subordinate the second control station is configured to display information from the controller and does not permit the operator to send all of the input commands to the controller possible from the master control station; and
  - in the second configuration the second control station is configured as the master control station to permit the operator to send input commands to the controller and to display information from the controller, and the first control station is subordinate to the master control station, and as the subordinate the first control station is configured to display information from the controller and does not permit the operator to send all of the input commands to the controller possible from the master control station;
- in the first configuration, using the first control station to cause the controller to selectively electronically communicate with one or more of the well platform systems to receive information from the respective one or more well platform systems and to selectively send system control commands to the respective one or more well platform systems; and
- in the second configuration using the second control station to cause the controller to selectively electronically communicate with one or more of the well platform systems to receive information from the respective one or more well platform systems and to selectively send systems control commands to the respective one or more well platform systems, further including: providing a plurality of security profiles stored in the controller, wherein: a first group of the plurality of security profiles enable selectively changing the configuration of the first and second control stations to designate which of the control stations is configured as the master control station; and a second group of the plurality of security profiles does not enable changing the configuration of the first and second control stations to designate which of the control stations is configured as the master control station; and using one of the first group of the plurality of security profiles to cause the controller to selectively change the configuration of the first and second control stations to designate which of the first and second control stations is configured as the master control station.

13. The method of claim 12, wherein:
- at least some of the plurality of security profiles are associated with respective well drilling processes; and
- a third group of the plurality of security profiles enable changing the configuration of the control system to designate which of the control stations is configured as the master control station during the respective well drilling process; and
- using one of the third group of the plurality of security profiles to cause the controller to change the configuration of the first and second control stations to designate which of the control stations is configured as the master control station during the respective well drilling process.

14. The method of claim 12, further comprising:
- providing a remote communication unit (RCU) located remote from the well drilling platform; and
- configuring the controller and the RCU to selectively electronically communicate with one another information relating to at least one of the well platform systems.

15. The method of claim 14, wherein the RCU is configured as one of the first and second control stations.

16. The method of claim 14, wherein the controller and the RCU selectively communicate with one another by a wireless connection.

17. The method of claim 16, wherein the controller selectively communicates with the RCU by email or text message.

18. The method of claim 14, wherein the RCU selectively communicates an RCU control command to the controller; and
- causing, upon receipt of the RCU control command, the controller to communicate with the one or more well platform systems based on the received RCU control command.

* * * * *